(12) United States Patent
Sherry

(10) Patent No.: US 10,907,461 B1
(45) Date of Patent: Feb. 2, 2021

(54) WATER HYDRATION SYSTEM

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 636 days.

(21) Appl. No.: 15/041,164

(22) Filed: Feb. 11, 2016

Related U.S. Application Data

(60) Provisional application No. 62/176,257, filed on Feb. 12, 2015.

(51) Int. Cl.
| | |
|---|---|
| *E21B 43/34* | (2006.01) |
| *B01D 1/14* | (2006.01) |
| *B01D 1/30* | (2006.01) |
| *B01D 1/20* | (2006.01) |
| *C02F 103/36* | (2006.01) |
| *B01D 1/00* | (2006.01) |

(52) U.S. Cl.
CPC ............ *E21B 43/34* (2013.01); *B01D 1/0058* (2013.01); *B01D 1/14* (2013.01); *B01D 1/20* (2013.01); *B01D 1/30* (2013.01); *C02F 2103/365* (2013.01); *C02F 2201/008* (2013.01)

(58) Field of Classification Search
None
See application file for complete search history.

(56) References Cited

U.S. PATENT DOCUMENTS

| | | | | |
|---|---|---|---|---|
| 2,372,846 A | * | 4/1945 | Nettel ..................... | C02F 1/10 |
| | | | | 159/13.4 |
| 2,560,226 A | * | 7/1951 | Joos ........................ | C02F 1/02 |
| | | | | 210/218 |
| 3,704,570 A | * | 12/1972 | Gardenier ............... | B01D 47/10 |
| | | | | 261/DIG. 76 |
| 3,716,458 A | * | 2/1973 | Greenfield ............... | B01D 1/26 |
| | | | | 159/13.2 |
| 3,855,079 A | * | 12/1974 | Greenfield ............... | B01D 1/14 |
| | | | | 159/13.2 |
| 3,954,381 A | | 5/1976 | Marecaux | |
| 4,270,974 A | * | 6/1981 | Greenfield ............... | B01D 1/14 |
| | | | | 159/16.3 |
| 4,303,121 A | | 12/1981 | Pangborn | |
| 5,207,869 A | * | 5/1993 | Harmoning .......... | B01D 1/0082 |
| | | | | 159/16.1 |
| 5,207,928 A | * | 5/1993 | Lerner ..................... | B01D 3/06 |
| | | | | 210/774 |
| 5,342,482 A | | 8/1994 | Duesel, Jr. | |
| 5,980,694 A | * | 11/1999 | Apeldoorn ............... | B01D 3/42 |
| | | | | 202/152 |
| 6,200,428 B1 | | 3/2001 | VanKouwenberg | |

(Continued)

OTHER PUBLICATIONS

U.S. Appl. No. 15/801,469, Raymond C. Sherry, filed Nov. 2, 2017.

*Primary Examiner* — Robert J Popovics
(74) *Attorney, Agent, or Firm* — Roger N. Chauza, P.C.

(57) ABSTRACT

A water hydration system for disposing of the water content of production fluid generated by a hydrocarbon well. The production water is processed to remove particulate matter, and then to separate the water from crude oil. The water is heated and pressurized and passed through a nozzle to produce a spray which flashes into steam in a duct carrying fresh air. The water vapor hydrates the air that is forced through the duct by a high capacity fan which blows the hydrated air into the atmosphere.

15 Claims, 8 Drawing Sheets

(56) References Cited

U.S. PATENT DOCUMENTS

| | | |
|---|---|---|
| 6,279,493 B1 | 8/2001 | Beaumont et al. |
| 6,309,542 B1 | 10/2001 | Kim |
| 6,325,361 B1 * | 12/2001 | Van Duijn ............... B01D 1/14 |
| | | 261/113 |
| 6,546,883 B1 | 4/2003 | Fink et al. |
| 6,637,379 B2 | 10/2003 | Hays et al. |
| 6,838,008 B2 * | 1/2005 | Fout ....................... B07B 13/16 |
| | | 210/780 |
| 6,971,238 B1 | 12/2005 | Walker |
| 7,150,111 B2 | 12/2006 | Viljanmaa |
| 7,251,939 B2 | 8/2007 | Walker |
| 7,722,739 B2 * | 5/2010 | Haslem ................... B01D 1/16 |
| | | 159/4.07 |
| 7,803,248 B2 | 9/2010 | Pinkham, Jr. et al. |
| 7,845,314 B2 | 12/2010 | Smith |
| 7,963,459 B1 * | 6/2011 | Sherry .................... B05B 1/308 |
| | | 239/13 |
| 8,097,128 B1 * | 1/2012 | Sherry .................... B05B 1/308 |
| | | 203/11 |
| 8,372,248 B1 * | 2/2013 | Sherry .................... B05B 1/308 |
| | | 202/160 |
| 8,425,664 B2 * | 4/2013 | Batty ....................... F28D 7/103 |
| | | 95/219 |
| 8,425,666 B2 * | 4/2013 | Batty ....................... B01D 1/14 |
| | | 95/235 |
| 8,425,668 B2 * | 4/2013 | Lakatos ................. B01D 1/305 |
| | | 95/267 |
| 8,460,509 B2 * | 6/2013 | Lakatos .................. B01B 1/00 |
| | | 159/47.3 |
| 8,602,320 B1 * | 12/2013 | Sherry .................... B05B 1/308 |
| | | 141/116 |
| 8,741,100 B2 * | 6/2014 | Duesel, Jr. ............... B01D 1/14 |
| | | 159/4.01 |
| 8,834,726 B2 * | 9/2014 | Keister ................... C01B 5/00 |
| | | 210/726 |
| 8,915,453 B1 * | 12/2014 | Sherry .................... B05B 1/308 |
| | | 239/11 |
| 9,429,317 B2 * | 8/2016 | Stock ....................... B01D 1/14 |
| 9,447,313 B2 | 9/2016 | Weinstein et al. |
| 9,682,330 B1 * | 6/2017 | Sherry .................... B01D 1/30 |
| 9,764,497 B2 | 9/2017 | Saffioti |
| 9,770,671 B2 * | 9/2017 | Curlett ................... E02B 15/042 |
| 9,809,478 B2 * | 11/2017 | Randal ...................... C02F 9/00 |
| 9,815,716 B2 * | 11/2017 | Miller ................... C02F 1/5236 |
| 10,273,167 B1 * | 4/2019 | Sherry ..................... B05B 1/32 |
| 10,389,121 B1 * | 8/2019 | Sherry ...................... H02J 7/35 |
| 10,441,894 B2 * | 10/2019 | Curlett ................. E02B 15/042 |
| 10,513,444 B1 * | 12/2019 | Sherry ..................... C02F 1/16 |
| 10,676,384 B2 * | 6/2020 | Randal ...................... C02F 9/00 |
| 2004/0008571 A1 | 1/2004 | Coady et al. |
| 2006/0197238 A1 * | 9/2006 | Forstmanis ............. C02F 1/048 |
| | | 261/78.2 |
| 2007/0235146 A1 * | 10/2007 | Haslem ................... B01D 1/16 |
| | | 159/47.3 |
| 2008/0250715 A1 * | 10/2008 | Cooper ................... B01D 47/06 |
| | | 48/197 FM |
| 2009/0199972 A1 * | 8/2009 | Lakatos ................. E21B 41/005 |
| | | 159/3 |
| 2009/0204419 A1 * | 8/2009 | Stewart ................... B01D 61/58 |
| | | 705/1.1 |
| 2009/0294074 A1 * | 12/2009 | Forstmanis ............. C02F 1/048 |
| | | 159/47.3 |
| 2010/0125044 A1 * | 5/2010 | Keister ................... E21B 43/40 |
| | | 507/200 |
| 2010/0175983 A1 * | 7/2010 | Batty ....................... C02F 1/12 |
| | | 203/24 |
| 2010/0176064 A1 * | 7/2010 | Batty ................... B01D 5/0012 |
| | | 210/737 |
| 2011/0005999 A1 * | 1/2011 | Randal ...................... C02F 9/00 |
| | | 210/614 |
| 2011/0140457 A1 * | 6/2011 | Lakatos ................. B03D 1/245 |
| | | 290/1 R |
| 2011/0303367 A1 | 12/2011 | Panz et al. |
| 2012/0228114 A1 | 9/2012 | Joseph, III et al. |
| 2013/0037223 A1 * | 2/2013 | Duesel, Jr. ............... B01D 1/14 |
| | | 159/4.01 |
| 2014/0238916 A1 * | 8/2014 | Duesel, Jr. ............... B01D 1/14 |
| | | 210/179 |
| 2014/0251881 A1 * | 9/2014 | Duesel, Jr. ............. C02F 1/048 |
| | | 210/149 |
| 2015/0218020 A1 * | 8/2015 | Miller ................... C02F 1/5281 |
| | | 210/724 |
| 2016/0311710 A1 * | 10/2016 | Duesel, Jr. ............. C04B 28/10 |
| 2017/0225992 A1 * | 8/2017 | Duesel, Jr. ............. C02F 1/048 |
| 2017/0333807 A1 * | 11/2017 | Curlett ..................... C02F 1/12 |
| 2018/0057384 A1 * | 3/2018 | Randal ...................... C02F 9/00 |

* cited by examiner

WATER HYDRATION SYSTEM

TECHNICAL FIELD OF THE INVENTION

The present invention relates in general to water processing systems, and more particularly to hydration systems for separating water from production fluid generated by petroleum wells, and hydrating the water into fresh air to dispose of the water.

BACKGROUND OF THE INVENTION

With the advent of the fracturing process to recover oil and gas that has heretofore been too expensive to obtain, there is an increased production of hydrocarbon fuels. The fracturing process effectively forms cracks in the formation where pockets of gas and oil are captured under pressure. The cracks in the formation allow the captured hydrocarbons to escape and move toward the wellhead. In the case of natural gas recovery, the hydrocarbon is recovered at the wellhead, together with other liquids, solids and gases. Natural gas, which is typically methane, moves from the fractured formation to the wellbore, together with crude oil that was also captured under pressure in the formation with the gas. Particulate matter, such as sand, also moves in the fractured formation to the wellhead and is recovered at the surface. Water also moves through the fractured formation to the wellhead by the natural pressure in the formation. The water can be from several sources, including that which is the natural ground water through which the wellbore was drilled, the flow-back water that was used to fracture the formation, and the water that was originally captured in the shale rock together with the natural gas.

The products recovered at the wellhead can be processed at the site before the natural gas is of sufficient "pipeline quality." The pipeline quality natural gas is then moved through a system of low pressure gathering pipes to a gas processing facility where the natural gas is purified by removing any butane, propane, ethane and pentanes, etc.

At the wellhead, the particulate matter and the crude oil are removed before the remaining gas is coupled to the gathering pipeline. A separator can be located at the well site to receive the fluid that is produced at the wellhead, and remove the raw natural gas from the remaining impurities. In the separator, the gas and liquid can be separated by the use of gravity to separate the various constituent elements. The gas rises to the top of the separator and can be coupled to the gathering pipeline. The oil and gas separate from each other based on the relative densities thereof, with the lighter density crude oil floating on top of the heavier density water. The liquid oil and water can thus be separated from the gas in the separator. The particulate matter is generally heavier and migrates to the bottom of the separator where it can be removed by transfer to a holding tank with the other liquids.

The water recovered at the well site is of substantial volume shortly after the well is brought into production. Much of the initial water is that which was pumped down the wellbore during the fracturing process. A gas well can produce more than a million gallons of water during this phase of production. The "frac water" generated at the well site is very toxic as it contains many chemicals that were mixed with fresh water in the fracing equipment and pumped under high pressure into the underground formation. In addition, many other toxic liquids and materials are absorbed by the frac water during the underground fracturing process. While the recovered frac water can sometimes be reused at other wells to fracture the underlying formation, the frac water must eventually be disposed of in an environmentally safe manner. The frac water is often referred to a "production water."

After the initial production where a huge volume of frac water is recovered at the well site, additional water continues to be recovered years after the initial opening of the gas well. In many cases, the water recovered at the well site is disposed of using tank trucks to haul the toxic water to a special disposal well. Disposal wells are special wells drilled in environmentally safe areas where there is little chance of contamination of subsurface aquifers and waterways. The cost of disposing the frac water in this manner can be as high as $9 per barrel, which is significant when overall profit margins are considered.

There have been attempts made to purify the production water so that it can be disposed of without trucking it to a disposal well. These on-site systems are generally complex and costly to purify the production water sufficiently so that it can be reused or returned to lakes or rivers or used for irrigation purposes. However, even when the water has been purified at the well site, it often must be trucked or piped to remote locations where it can be reused.

From the foregoing, it can be seen that a need exists for a method of disposing of the purified water at the well site without incurring substantial cost. A further need exists for a water processing system that is mobile and can separate the constituents of the production fluid into gases, liquids and solids, where the water is disposed of at the well site so that it need not be transported to a different location. A need exists for a system that hydrates the water at the well site so that it is no longer in liquid form. A further need exists for a hydration system that is mobile and can be easily transported on a trailer with a small utility truck, and set up at the well site. Another need exists for a hydration system that heats the water and processes the same before being converted into steam and/or water vapor and hydrated into the air. An additional need exists for a hydration system that generates its own electrical power and mechanical power using an engine fueled by the fuel generated at the well site. A further need exists for a hydration system in which the engine is used to preheat the production water by circulating the production water through the cooling system of the engine, and where the heat coming off the engine is used in the water hydration process.

SUMMARY OF THE INVENTION

In accordance with the principles and concepts of the invention, disclosed is a hydration system that is mobile so that it can be moved from well site to well site to dispose of the production water on site without hauling it to a remote disposal well.

According to a feature of the invention, disclosed is a hydration system that accepts raw production fluid from a hydrocarbon well and processes the same to remove the volatile gases and the oil content in a separator, and then further processes the remaining water to efficiently hydrate the atmosphere so that expensive hauling of the same to a remote site is not necessary. The separator employs a nozzle to spray the raw production fluid into a container to facilitate separation of the constituent elements, and then pressurizes the separated water to a high pressure and heats the pressurized water so that it is sprayed into a hydration unit. Steam, water vapor and liquid water are produced in the hydration unit. In the hydration unit, a large volume of atmospheric air is drawn therein to evaporate the water vapor and hydrate the air, and then force the hydrated air into the atmosphere.

According to yet another feature of the invention, the hydration unit includes an engine fueled by gas from the gas well. The production water processed in the system can be circulated through the cooling system of the engine to both cool the engine and preheat the production water before it is further processed. A very energy efficient system is thus realized.

A further feature of the hydration system of the invention is that much of the water from the gas well is turned into water vapor that is hydrated into the atmospheric air, and a portion of the water is turned into steam and converted to a purified form of water that can be returned to the ground in an environmentally safe manner.

According to an embodiment of the invention, disclosed is a hydration system which includes a separator for separating water from other fluids, a pump for pressurizing the water, a heater for heating the pressurized water, a fan for producing a flow of air, and a nozzle for processing the pressurized water to produce a spray in the flow of air produced by the fan so that the water is hydrated into the air.

According to another embodiment of the invention, disclosed is a hydration system which includes a filter for filtering solids from an aqueous liquid, a separator for separating water from other fluids of the aqueous liquid, a pump for pressurizing the water to a pressure exceeding about 750 psi, a heater for heating the pressurized water to a temperature exceeding about 212 degrees F., and a fan for producing a flow of atmospheric air. Further included is a duct for carrying the flow of atmospheric air therethrough, where the duct has an inlet through which air is input into the duct, and the duct has an outlet through which hydrated air exits the duct. A nozzle is located in the duct, and the nozzle is for processing the pressurized and heated water to produce a spray which flashes at least partially into steam in the flow of air through the duct. The steam turns into water vapor which is hydrated into the flow of air in the duct.

According to a further embodiment of the invention, disclosed is a method of hydrating water, which includes passing an aqueous liquid through a separator to separate different density liquids and isolate water therefrom, heating and pressurizing the isolated water, spraying the heated and pressurized water from a nozzle into a duct carrying air therethrough. The spray is then converted in part to a vapor that is hydrated in the air. The hydrated air is then forced into the atmosphere.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
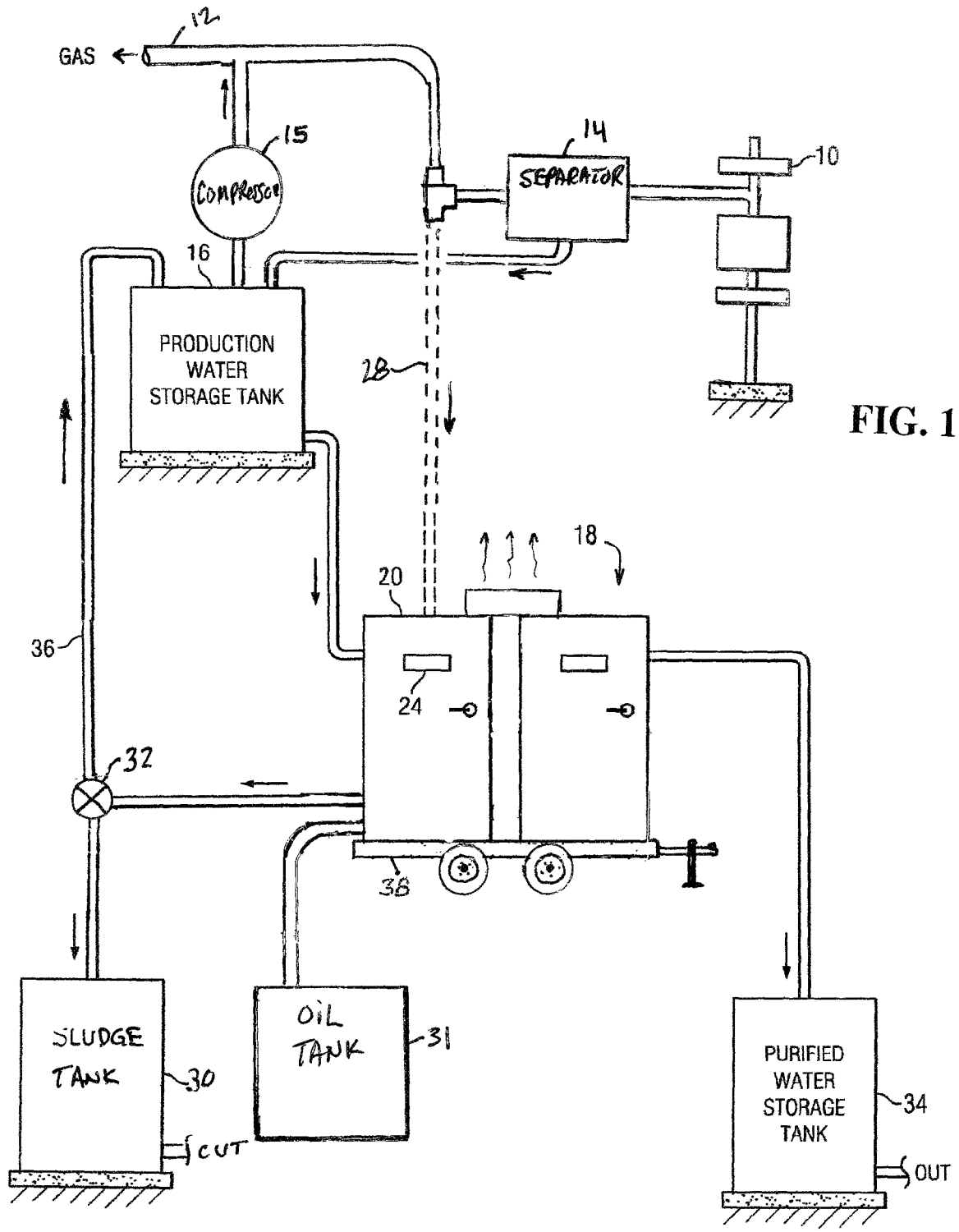
FIG. 1 is a block diagram of the well site equipment for hydrating the water content of the production fluid, according to one embodiment.

With reference to FIG. 1, there is shown an environment in which the principles and concepts of the invention can be advantageously practiced. Shown is a wellhead 10 for a natural gas well. The gas well equipment produces natural gas at an outlet 12. The conventional equipment, including regulators and pumps, for transporting the natural gas are not shown. In addition to the production of natural gas, the gas well also produces a large amount of production water which includes many contaminants, some of which are toxic. Some of the contaminants in the production water may include oil, salts, minerals, heavy metals, etc.

The fluids produced at the wellhead 10 are processed through a gravity separator 14, or other type of separator, where the gas is separated from the production water. The separated production water is coupled to the production water storage tank 16. It can be appreciated that natural gas can be absorbed in the production water, and will be desorbed therefrom and collect in the top of the production water tank 16. Accordingly, a piston-type pump or compressor 15 can be employed to compress the gas vented from the production storage tank 16 and to couple the same to the output natural gas line 12. This eliminates the common practice of venting the desorbed gas vapors from the production water storage tank 16 to the atmosphere.

Production water is extracted from the gas well and is often naturally pressurized by the pressure in the underground formation. In other cases, the production water can be pumped with a pump to one or more storage tanks 16. Since gas wells can initially produce 30-40 gallons of water per minute, each storage tank 16 can have a capacity of about 15,000 gallons. Typically, production water is transported by a large tank truck to a deep disposal well where it is pumped underground. This is not only costly, but presents the hazard of potentially contaminating the underground water supply, as well as the soil. It is speculated that the deep disposal wells are also the cause of localized earthquakes.

In accordance with the invention, the production water is processed on site by a mobile water hydration system 18. The water hydration system 18 is securely enclosed in an enclosure or module 20 which is locked to provide security to the hydration system 18. By enclosing the components of the hydration system 18 in a locked module, tampering, theft and damage by unauthorized persons are minimized. Video cameras, audio equipment, motion sensors and other apparatus can be employed to assure security and safety to the hydration system 18 as well as the wellhead 10. The hydration system 18 is preferably processor controlled to provide automatic control and diagnostics for the system 18. To that end, a glass window 24 can be provided to allow a serviceperson to view various indicators and determine the state of the hydration system and the relevant operating parameters. Also, the hydration system 18 can be equipped with telemetry equipment to allow remote monitoring of the hydration process at the well site. A remote monitor station can thus monitor and control the operating parameters of the hydration system 18. Indeed, the remote monitor station can control a number of hydration systems in a geographical area to collectively control certain conditions of the atmosphere common to the geographical area. For example, if it is desired to increase the humidity of the geographical area, then the hydration systems in that area can be remotely controlled to produce a maximum amount of water vapor evaporated in the atmosphere. This may lead to a certain degree of climate control in such area.

It is anticipated that the module 20 will be about ten feet tall and have a footprint of about seven foot by twelve foot, and weigh about 6,000 pounds. The module 20 can be anchored to a concrete pad, mounted on a skid, or more preferably permanently mounted to a trailer 38 that can be pulled by a conventional utility truck. In other words, the module 20 is bolted or welded to the trailer 38 so that it is not easily removable therefrom. It is anticipated that the module 20 will be transported on a two axle trailer to the well site by a truck, or by other suitable means. The needs of the hydration system 18 will be determined in advance, and then the particular components will be provided in the module 20 and transported to the well site. It is further anticipated that if during use of the water hydration system 18 a major component fails or requires rebuilding, the entire module can be returned to the factory for refurbishment, and will be immediately replaced with an identical water hydration module. This reduces down time of the system 18. However, routine maintenance and replacement of rudimentary parts can take place at the well site. An onboard computer system will be programmed to understand the severity of component failures and inform the remote location of the same via telemetry means.

In one embodiment of the invention, the energy required for operation of the water hydration system 18 is the natural gas produced at the wellhead 10. The natural gas can be coupled by a pipe 28 to the system 18 and used for generating heat to convert the production water to steam. As will be described below, the natural gas from the wellhead 10 is also used to fuel an engine that provides rotary power to drive equipment, such as an electrical generator. Alternatively, or in addition thereto, the gas from the wellhead 10 can be used to generate steam to turn a generator to generate electricity for otherwise supplying the electrical requirements of the water hydration system 18. As will be described in more detail below, the water hydration system 18 includes a high efficiency heater to heat the production water to a very high temperature to create a high percentage of steam and water vapor. The module 20 may include a low pressure water pump, one or more filters for filtering large particulate matter from the production water, a combined oil/water/volatile vapor separation chamber, a high pressure pump and a high temperature heater to heat the pressurized production water to a high temperature. The high temperature water can then be sprayed into an expansion chamber which generates steam and water vapor. A condenser can be employed for condensing the steam into a form of purified water. A fan produces a large volume of air that is passed through the steam and water vapor to hydrate the air stream. It is recognized that steam is very similar to water vapor, except that steam is an invisible high temperature gas, whereas water vapor is a lower temperature visible gas. Accordingly, when the steam is sprayed into the airstream, much of the steam is lowered in temperature and thus turns into water vapor which can be easily evaporated.

The modular nature of the water hydration system 18 lends itself well for tandem use during initial operation of a gas well when the volume of production water is high. Initially, the amount of production water produced by a gas well can be thirty gallons per minute, or more, but will eventually drop to about 3-4 gallons per minute. The water hydration system 18 of the preferred embodiment is adapted for processing about 3-10 gallons of hydrated fresh water per minute. The water hydration system 18 operates independently and autonomously to process production water and produce hydrated air, and also pure water for a variety of uses. Multiple water hydration systems 18 can be initially connected to the production water supply tank 16 and simultaneously process large quantities in parallel to dispose of the water content thereof by hydrating the air. As the production water from the gas well decreases over time, one or more of the modular hydration systems 18 can be removed from the well site, leaving only the appropriate number of systems 18 to process the volume of production water being produced at that time. The water hydration systems 18 are each cost effective, easily portable because of the modular nature, to thus provide a significant flexibility to adjust to the capacity needs that exist, without having excess water processing capacity that is not used. The modular feature of the water hydration system 18 allows the module 20 to be easily connected and disconnected to the well site facilities, and hauled on the trailer 38 to another site.

In an embodiment of the hydration system 18, a purified form of water is generated and can be temporarily stored in a storage tank 34. Alternatively, the purified form of water generated by the hydration system 18 can be recycled internally to generate water vapor that is hydrated into the air. Particulate matter in a slurry form removed from the production water by the hydration system 18 can be pumped to a sludge tank 30 for temporary storage until hauled away and appropriately disposed of. A valve 32, which may include a strainer, is controlled by the processor and can be switched to route the particulate matter to the storage tank 30, or switched for transferring the sludge to the production water storage tank 16. The sludge can accumulate in the production water storage tank 16 until the level thereof reaches a predefined volume, whereupon it can be withdrawn and appropriately disposed of. Even if some of the sludge in the production water storage tank 16 is recirculated to the hydration system 18, it will again be separated and returned to the storage tank 16. Liquid hydrocarbons, such as oil, are byproducts and can be separated by the hydration system 18 and coupled to an oil storage tank 31. When full, the oil in the tank 31 can be hauled away and processed as crude oil.

Figure 2:
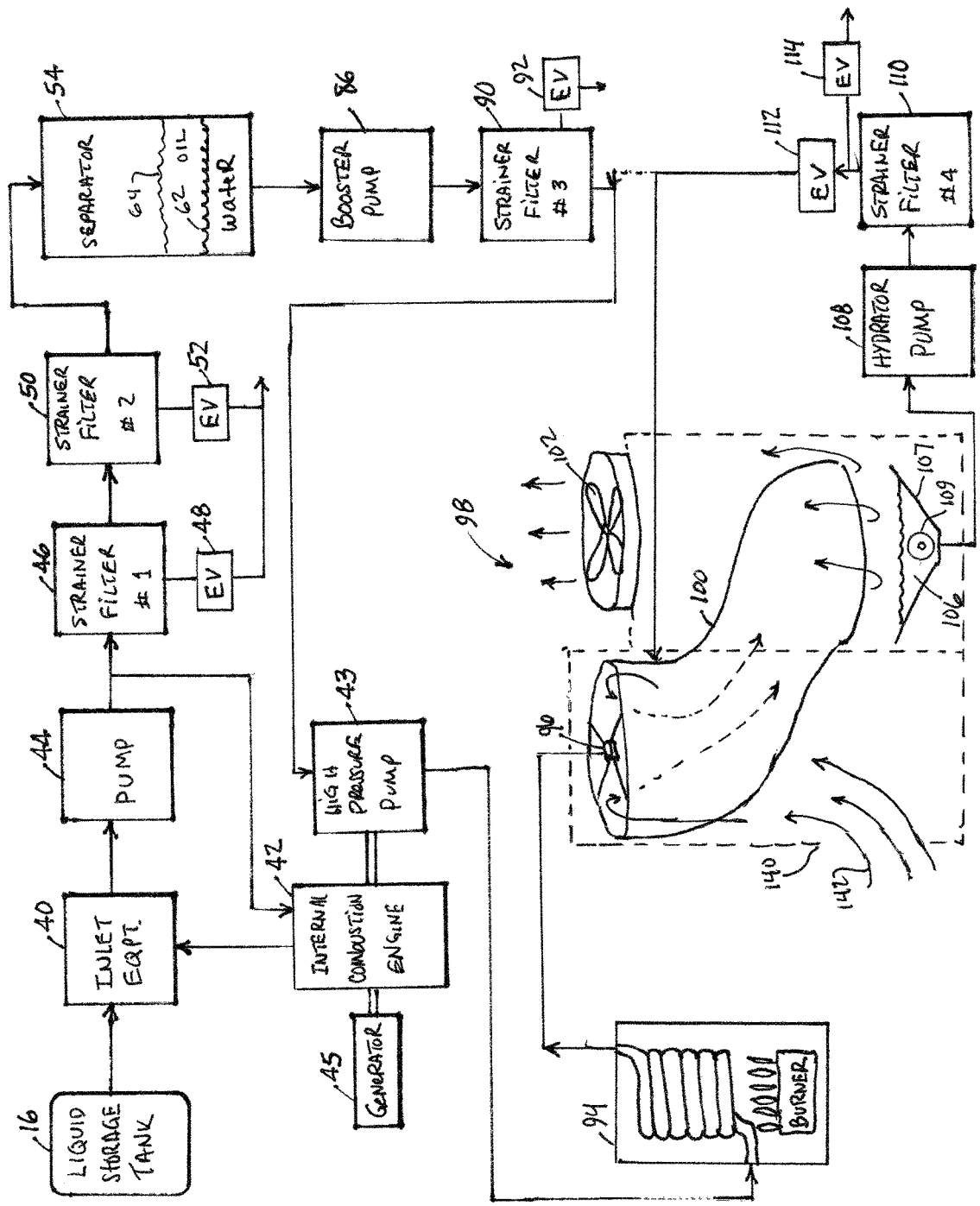
FIG. 2 is a block diagram of a hydration system according to an embodiment of the invention.

FIG. 2 illustrates the details of an embodiment of a hydrator system 18 constructed according to the invention. As will be appreciated from the following, the production water is processed by the hydration system 18 without preprocessing by other equipment that is often necessary with other conventional production water processing systems. The hydration system 18 includes an inlet 40 that receives the production water from the production water storage tank 16 that is located at the well site. The inlet 40 can be a manifold or other input/output piping structure. The production water that is input to the inlet 40 from the storage tank 16 is generally about 80-180 degrees F. This is the temperature of the subterranean formation from which the production water is produced. As will be described below, the system inlet 40 also receives a portion of the production water after it has been circulated through the cooling system of an internal combustion engine 42. The temperature of the production water delivered at the output port of the system inlet 40 can be up to 220 degrees F., due to the heating thereof in the engine 42. The engine 42 is the source of rotary power for a high pressure pump 43. The engine 42 is also connected to an AC generator 45 for fulfilling the electrical energy needs of the hydration system 18. An eight cylinder natural gas fueled engine 42 is employed in the preferred embodiment to drive the loads, as well as increase the temperature of the production water, in the neighborhood of about 20 degrees. As an alternative, rather than using an internal combustion engine 42 to drive the high pressure pump 43, an electrical motor (not shown) can be utilized.

From the system inlet 40, the production water is pumped by a pump 44 at a pressure of about 40 psi. From the pump 44, the production water is pumped to a first strainer filter 46 which filters out the particulate matter of a certain size. In the preferred embodiment, the first strainer filter 46 has a screen size of about ten mesh. The screen mesh can be cleaned by opening an electrical valve 48 to flush the particulate matter collected on the screen filter media. The electrical valve 48 is preferably controlled by the programmed processor that senses when the strainer filter 46 reaches a reduced flow capacity, meaning that the screen mesh requires flushing to remove the particulate matter that has been filtered from the production water. The flow capacity of the strainer 46 is determined by the use of a pressure monitor on the input side and another pressure monitor on the output side of the strainer filter 46. The processor monitors the pressure sensors to determine when the screen mesh needs to be flushed of the particulate matter. The production water flushed out of the electrical valve 48 can be collected and recirculated in the manner described above.

From the first strainer filter 46, the filtered production water is coupled to a second strainer filter 50, which is equipped with a forty mesh screen to filter out small-size particulate matter from the production water. Much like the first strainer filter 46, the second strainer filter 50 includes an electrically-operated valve 52 to flush the particulate matter from the forty mesh screen.

Figure 3:
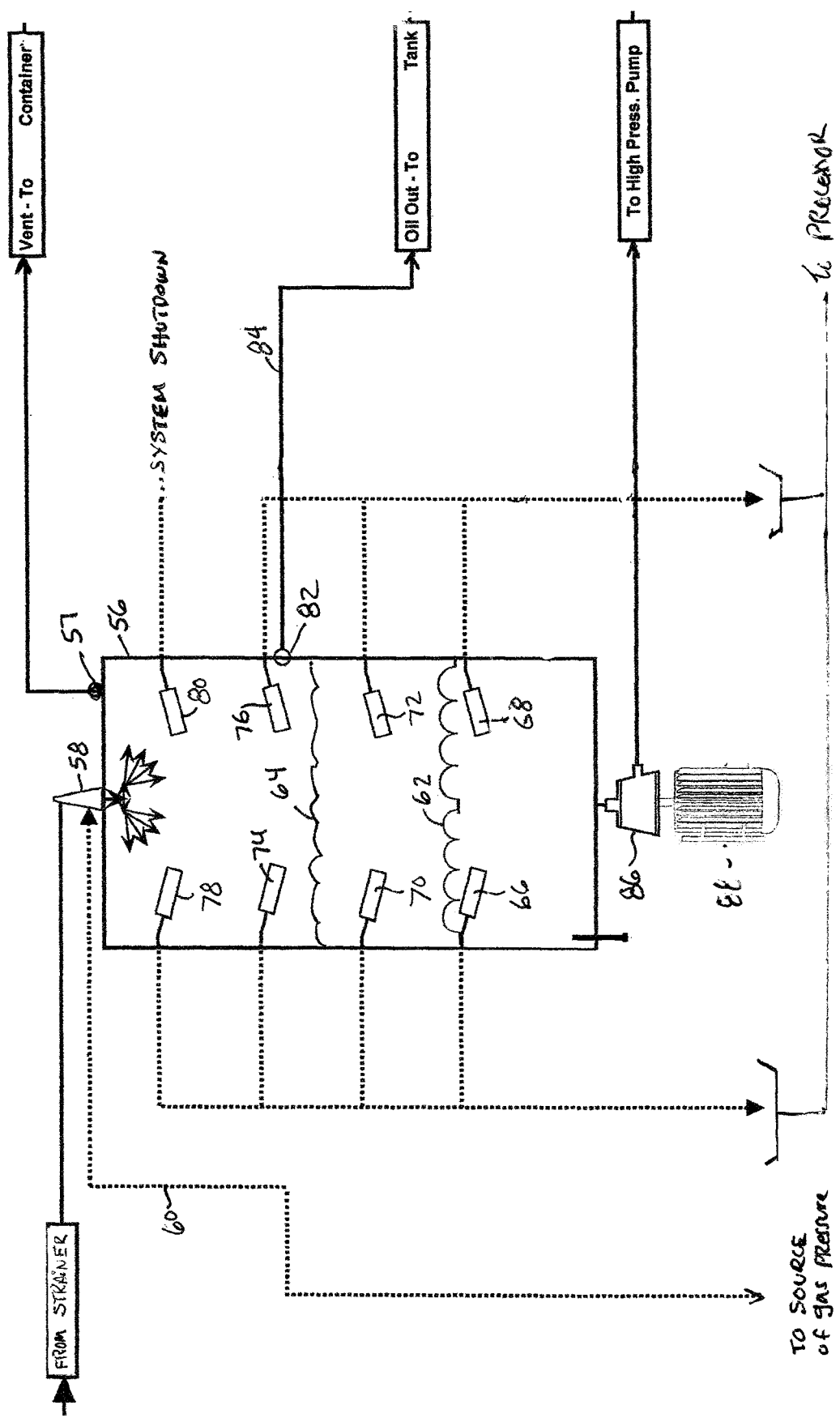
FIG. 3 is a diagram of the details of the separator of the hydration system of FIG. 2.

Once a substantial amount of the particulate matter has been filtered out of the production water, the filtered production water is coupled to a separator 54 where the vapors and oil are separated from the production water. The details of the separator 54 are illustrated in FIG. 3. Here, the filtered production water is coupled by a pipe to a nozzle 58 fastened to the top cover plate of a separator tank 56. The nozzle 58 sprays the filtered production water into the tank 56 to facilitate the separation of vapors, oil and water which are the components of the filtered water. Various types of fluid nozzles can be utilized in the separator 54, including the spring-operated nozzles disclosed in U.S. Pat. Nos. 7,963, 459 and 8,602,320 both by Sherry. The disclosures of such patents are incorporated herein by reference. In the preferred embodiment, a pneumatic-operated nozzle 58 is employed, such as the type disclosed in U.S. Pat. No. 10,273,167.

The pneumatic-operated nozzle 58 includes a nozzle member that is forced in one direction away from a seat by the pressure of the filtered production water. The space between the nozzle member and the seat defines an orifice through which the filtered production water is sprayed inside the separator tank 56. The force of the filtered production water on the nozzle member is opposed by the plunger of a pneumatic cylinder which produces a counterforce in opposition to the force of the filtered production water. The amount of the counterforce is controlled by a pneumatic pressure in the control line 60. The nozzle 58 can also be controlled by pressurized air from an onboard air compressor. The nozzle 58 can also be used to control the amount of production water inlet into the separator tank 56, to balance the desired amount of production water level in the tank 56, and even to stop the flow of the production water into the separator tank 56. In effect, the nozzle 58 can be controlled by the amount of fluid pressure in the control line 60 to thereby control the rate at which the production water is allowed into the separator tank 56. The amount of pneumatic pressure in the control line 60 is controlled by the programmed processor. As the pressure in the control line 60 is increased, the counterforce in opposition to that placed on the nozzle member by the filtered production water is correspondingly increased. This reduces the size of the orifice and increases the upstream pressure of the filtered production water, as well as reduces the amount of production water entering the separator tank 56 as a function of time. As the pressure in the control line 60 is decreased, the counterforce in opposition to that placed on the nozzle member by the filtered production water is correspondingly decreased. This increases the size of the orifice and decreases the upstream pressure of the filtered production water, as well as increases the amount of production water entering the separator tank 56 as a function of time. Similarly, as the upstream pressure of the filtered production water varies due to the speed of the pump 44, and other variables, the pressure of the filtered production water applied to the separator 54 is controlled by the nozzle 58 and remains relatively constant. Any buildup of residue on the nozzle orifice surfaces, or particulate matter lodged therein, effectively reduces the orifice size, whereupon the upstream pressure of the filtered production water temporarily increases until the nozzle 58 automatically responds by opening the nozzle orifice until the upstream pressure is restored to that which corresponds to the pneumatic pressure in the control line 60. The nominal size of the orifice of the nozzle 58 during dynamic operation is controlled by the amount of pneumatic air pressure in the control line 60, but the nozzle member automatically moves itself to correct any momentary imbalance in the pressure of the upstream liquid. The source of pneumatic pressure for use in operating the pneumatic cylinder of the nozzle 58 is preferably the pressure of the natural gas at the wellhead 10. While not shown, a pressure regulator is used to pass the natural gas from the wellhead 10 to the nozzle 58 at a controlled and preset pressure. The setting of the regulator can be changed by the programmed processor, which would establish a different pressure in the upstream production water.

In any event, the filtered production water is sprayed inside the separator tank 56 as a mist to facilitate separation of the 40 psi 100-212 degree F. filtered production water. The ambient pressure in the separator tank 56 is low, about 2-3 psi, to facilitate the release of vapors from the spray of filtered production water. The volatile vapors rise in the separator tank 56 and are removed via the port 57 and are either collected in a container for subsequent disposal, or returned to the natural gas pipeline via the compressor 15 of FIG. 1. As will be described below, the high pressure pump 43 further pressurizes the water content output from the separator 54. Many such high pressure pumps require the liquid input thereto to be below a specified temperature so that damage to the pump 43 is not sustained. Accordingly, fresh air can be pumped into the top portion of the separator tank 56 to cool the vapors through the evaporation process so that the high pressure pump is not overheated. The vapors can also be incinerated or otherwise burned off to dispose of the same. When the vapors are found to be volatile, they can be coupled to a heater of the hydration system 18 to be used as a supplemental fuel. In any event, the volatile vapors are removed before the production water is heated by the downline heater equipment.

According to commonly known principles of a gravity separator, the oil is separated from the water content of the filtered production water according to the respective densities thereof. The water having a greater density than that of the oil, settles to the bottom of the separator tank 56, and the oil floats on the surface of the water. The surface of the water is illustrated as numeral 62, and the surface of the oil inside the separator tank 56 is illustrated as numeral 64. In order to determine the level of the various liquids in the separator tank 56, a corresponding number of level sensors are fixed within the cylindrical wall of the separator tank 56. Each liquid level sensor is located at a different vertical position within the separator tank 56. For example, low level liquid sensors 66 and 68 determine different low levels of liquids in the tank 56. Mid level liquid sensors 70 and 72 determine different mid levels of liquids in the tank 56. High level liquid sensors 74, 76 and 80 determine different high levels of the liquids in the tank 56. Lastly, emergency level liquid sensor 80 determines an emergency level of liquids in the separator tank 56. When the emergency liquid level is sensed by sensor 80, the system can be shut down completely, or in stages. Those skilled in the art may prefer to utilize liquid level sensors that are sensitive only to the density of oil and the density of water to assure that the respective sensors measure the respective levels of the particular types of liquids. Sonic or other types of liquid level sensors can be utilized with equal effectiveness.

All of the sensors 66-80 are electrically coupled to the programmed processor. If the liquid level in the separator tank 56 is determined to be at the level of either sensor 66 or 68, then the flow of the production water is increased to fill the separator tank 56 to a higher level. When the level of liquid is sensed to be around the level sensors 74 and 76, then a port 82 in the separator tank 56 is opened to drain some of the oil out via line 84. The oil can be drained or pumped to the tank 31 for holding the crude oil separated from the production water in the separator tank 56. The separated crude oil can be stored temporarily until hauled away for suitable disposal, or used in some other manner. In many instances, the crude oil that is separated in the tank 56 can be sold on the market as other crude oil is sold.

The water collected at the bottom of the separator tank 56 is pumped therefrom by a booster pump 86 driven by either a variable speed or constant speed AC motor 88. The booster pump 86 is controlled by the programmed processor via the motor 88 to either turn the booster pump 86 on and off, or vary the speed thereof to maintain a desired level of liquid in the separator tank 56. The liquid level in the separator tank 56 is controlled by valve 92 (FIG. 2). The booster pump 86 is used to prevent the high pressure positive displacement pump 43 from cavitating, since the water pumped by the high pressure pump 43 can be at a temperature up to about 185 degree F. The booster pump 86 transfers the separated water to a strainer filter 90. The strainer filter 90 includes an eighty mesh filter medium to filter out fine particulate matter. The pressure of the separated water pumped to the third strainer filter 90 can be up to 60 psi. The electrical valve 92 is controlled by the processor for allowing the particulate matter to be flushed from the eighty mesh filter medium of the strainer filter 90, as well as to control the liquid level in the separator tank 56. Again, the particulate matter from all of the strainer filters can be collected in the sludge tank 30 for suitable disposal thereof, or returned to the production water storage tank 16.

The booster pump 86 pumps the separated water through the strainer filter 90 to the high pressure pump 43 that is driven by the natural gas engine 42. As noted above, rather than using an internal combustion engine 42, an electric motor can be utilized to drive the high pressure pump 43, as well as the use of an electric pump. Nevertheless, the high pressure pump 43 can be of the positive displacement piston-type liquid pump. In practice, the high pressure pump 43 pumps the separated water at a pressure of about 2,000 psi, and at a rate of about 10.0 g/m to a robust heater 94. The heater 94 can be of many different configurations, but in the preferred embodiment includes one or more helical finned coils through which the high pressure water is pumped for heating to a high temperature that exceeds the boiling point thereof. About 1.0-3.0 million BTU of heat is generated by a burner in the heater 94 around the finned coil. The flame of the burner is embedded in a flame mesh that provides a high density heat. The heater 94 is configured as a single-pass structure which produces high temperature fumes that are carried to the fresh air duct 100 where they are scrubbed. The engine exhaust is also scrubbed. The scrubbing of the exhaust fumes from the heater 94 and the engine 42 are described below. The heater 94 can be cleaned by periodically increasing the temperature therein, or by injecting an abrasive into the water stream to dislodge scale and other deposits accumulated on the inside surfaces of the finned helical coil. The system can be cleaned using an abrasive as the nozzle 96 is constructed to operate with a liquid stream that carries particulate matter. The heater 94 is preferably enclosed in an insulated enclosure to confine the flame therein so that no flame is exposed externally to cause a potential fire hazard in the system 18. In practice, the high pressure water passing through the heating coil reaches a temperature of about 500-700 degrees F. when exiting the heater 94. When processing the separated water at this temperature, the flash point is not reached because the pressure is also at a high level. However, it can be appreciated that if the pressure of the separated water passing through the heater 94 is reduced for some reason, the flash point could be reached, whereupon unpredictable accelerated fouling can occur in the heater coil. Nonetheless, if the temperature and pressure parameters of the separated water are maintained within limits, no premature flashing of the water occurs in the heater 94.

The heated and pressurized water is coupled from the heater 94 to a hydration nozzle 96 of a hydration unit 98. The hydration nozzle 96 is substantially of the same construction as the separator nozzle 58, except the hydration nozzle 96 is equipped with a pneumatic cylinder that is operated at a much higher counterforce to oppose the much higher pressure of the heated water coupled thereto. The pressure of the heated water coupled to the hydration nozzle 96 causes the nozzle member to open until equilibrium is reached between the 2,000 psi liquid forcing the nozzle member in one direction, and the counterforce of the pneumatic cylinder forcing the nozzle member in the opposite direction. Again, the pneumatic cylinder is operated or controlled by the natural gas pressure at the wellhead 10, via a regulator. It can be appreciated that when using the same source of gas pressure to operate both the separator nozzle 58 and the hydrator nozzle 96, the active area of the pneumatic cylinder in the hydrator nozzle 96 is larger than the active area of the pneumatic cylinder of the separator nozzle 58. The programmed processor controls the gas pressure through the same or a separate regulator that is coupled to the pneumatic cylinder of the hydrator nozzle 96. Again, the hydrator nozzle 96 assures that the upstream pressure of the heated water is maintained at a relatively constant pressure to assure that no premature flashing occurs in the heater 94. Also, any particulate matter that forms during the flashing of the water passes through the hydrator nozzle 96 and does not interfere with the operation of the hydrator unit 98. The nozzle member automatically opens to accommodate any particulate matter lodged in the nozzle orifice, or any residue buildup on the orifice surfaces, as described above in connection with the separator nozzle 58.

When processing production water recovered from hydrocarbon wells, the water can be saturated with salt. When the saturated water is heated and forced through the nozzle 96 under pressure, the products that result are steam, water and solids. As the saturated water passes through the nozzle 96, the temperature drops abruptly to about 212 degrees F., and is unable to hold the salt in ion or liquid form. Accordingly, some of the dissolved salt in the water is converted to a salt in solid form as particles, and the remaining water will contain a substantial amount of the salt in liquid or ionic form. The water that flashes into steam reduces the water content and further facilitates the conversion of the salt from liquid form to a solid form. The crystallization of the salts can be further facilitated by the addition of air to the hydration chamber in which the nozzle 96 is located. Accordingly, the salt particles that are emitted from the nozzle 96 will undergo additional crystallization due to the addition of air to the hydrator inlet. In effect, the air evaporates an additional amount of the water spray to remove more water so that any salt in the liquid is converted to solid matter. This is especially important in Zero Liquid Discharge Systems.

The hydrator unit 98 functions to hydrate the atmosphere with evaporated water vapor so that no further disposal of the water content of the production water is necessary, except for any purified water that is a possible byproduct of the hydration system 98. The purified water is safe and can be used or disposed of in any suitable manner. This is important, as the primary volume of the production water is water, and the disposal thereof without piping or trucking the same to a disposal site is unnecessary with the use of the hydration system 18 of the invention. The high temperature and high pressure water passing through the hydrator nozzle 96 causes a large portion of the water to be separated and flashed into steam when it is exposed to the much lower pressure in the hydration unit 98. The pressure in the hydration unit 98 may be on the order of a few psi, as the internal area of the hydration unit 98 is exposed to the atmosphere. The hydration unit 98 includes a fresh air duct 100 with a top to which the hydration nozzle 96 is mounted so that the water flashes into steam within the entrance end of the duct 100. Water vapor as well as steam is also generated by the hydrator nozzle 96. While a large capacity fan 102 is preferably located above the exit end of the duct 100, the fan 102 can be fastened at other locations within the duct 100. The fan 102 draws fresh atmospheric air 142 through the hydration unit 98 and thus through the flashed steam and water vapor created at the entrance end of the air duct 100. In practice, the fan 102 is fastened to the top of the hydration unit 98 over the exit end of the duct 100. In any event, air is drawn into the duct 100 in the direction of arrows 142 and converts the steam into water vapor which is allowed to evaporate and escape into the atmosphere. With a large volume of fresh air passing through the hydration unit 98, up to 30-100 percent of the concentrated salt water can be converted to water vapor that evaporates and is transferred to the ambient atmosphere. The steam can be vented out of the hydration unit 98 separately to reduce the load on the hydrator. Also some of the excess steam can be routed to both generate liquid water and dry the solids even more. The steam and or hot water can be routed through the nozzle 96 to heat recycled water or generate suction to move the water. Air may be allowed to enter the hydration unit 98 from side as well as at the nozzle position. Air can be brought into the duct 100 at other locations, in addition to the nozzle location.

In the preferred embodiment, the ambient air is drawn into the hydration unit 98 and through the duct 100, which has a cross-sectional area of about 8-14 square feet. The fan 102 draws the fresh air through the large duct 100 at about 50,000 cfm. The speed of the fan 102 can be processor controlled so that as the fan is slowed down, the air coming out of the hydration unit 98 is hotter and more dense (more water per cubic foot). The faster the fan 102 is operated, the cooler the air that comes out of the hydration unit 98. The temperature of the air (with the evaporated water vapor therein) carried to the atmosphere is between about 80-200 degrees F. Various sensors can be situated internal and external to the hydrator unit 98 to determine the efficiency of the conversion of the water vapor and the extent to which the atmosphere accepts the increased water vapor. It can be seen that a very large volume of air passes through the hydration unit 98 to convert the steam and concentrated water to water vapor, evaporate the water vapor, and move the same into the atmosphere. It will be described below the details of the duct 100 and other structural features of the hydration unit 98 so that the hydrated air is not drawn back into the hydration unit 98 and reprocessed.

With reference yet to FIG. 2, water 106 falls to the bottom end of the hydrator duct 100 and is collected in a condensate pan 107. The water 106 collected is that which was not converted into a vapor during the flash evaporation process. Any solids created during the flash evaporation process are also collected in the condensate pan 107. The water 106 that collects in the condensate pan 107 is expected to be at a temperature of about 115 degrees F. A hydrator pump 108 is adapted for pumping the collected un-flashed water 106 and suspended solids from the bottom of the hydrator unit 98 and for recirculating the same through the inlet end of the duct 100 to be hydrated, and that which remains in liquid form drains back to the condensate pan 107. The water recirculated from the condensate pan 107 is pumped by pump 108 through a strainer 110 and electrically-controlled valve 112. The programmed processor can control the electrical valve 112 to allow recirculation of the un-flashed water 106, as well as to control the flushing of particulate matter from the mesh screen of the strainer filter 110 by opening the electrically-controlled valve 114 and closing the valve 112. Alternatively, the un-flashed water 106 can be recirculated back to the high pressure pump 43. In addition, the un-flashed water 106 from the condensate pan 107 can be recirculated by the hydrator pump 108 through electrically-controlled valve 114 and to the production water storage tank 16 to again be processed through the hydration system 18. The solids that settle to the bottom of the condensate pan 107 can be removed by operating an auger 109 located at the bottom of the condensate pan 107. The auger 109 can move the solids out of the condensate pan 107 and out of the hydration unit 98 for appropriate disposal thereof, such as undergoing a drying process, sent to a landfill, etc. When the solids are removed from the water at the condensate pan 107 and reprocessed, the water reaches a point of supersaturation so when the hydrator nozzle sprays the supersaturated water, crystals are generated.

Figure 4:
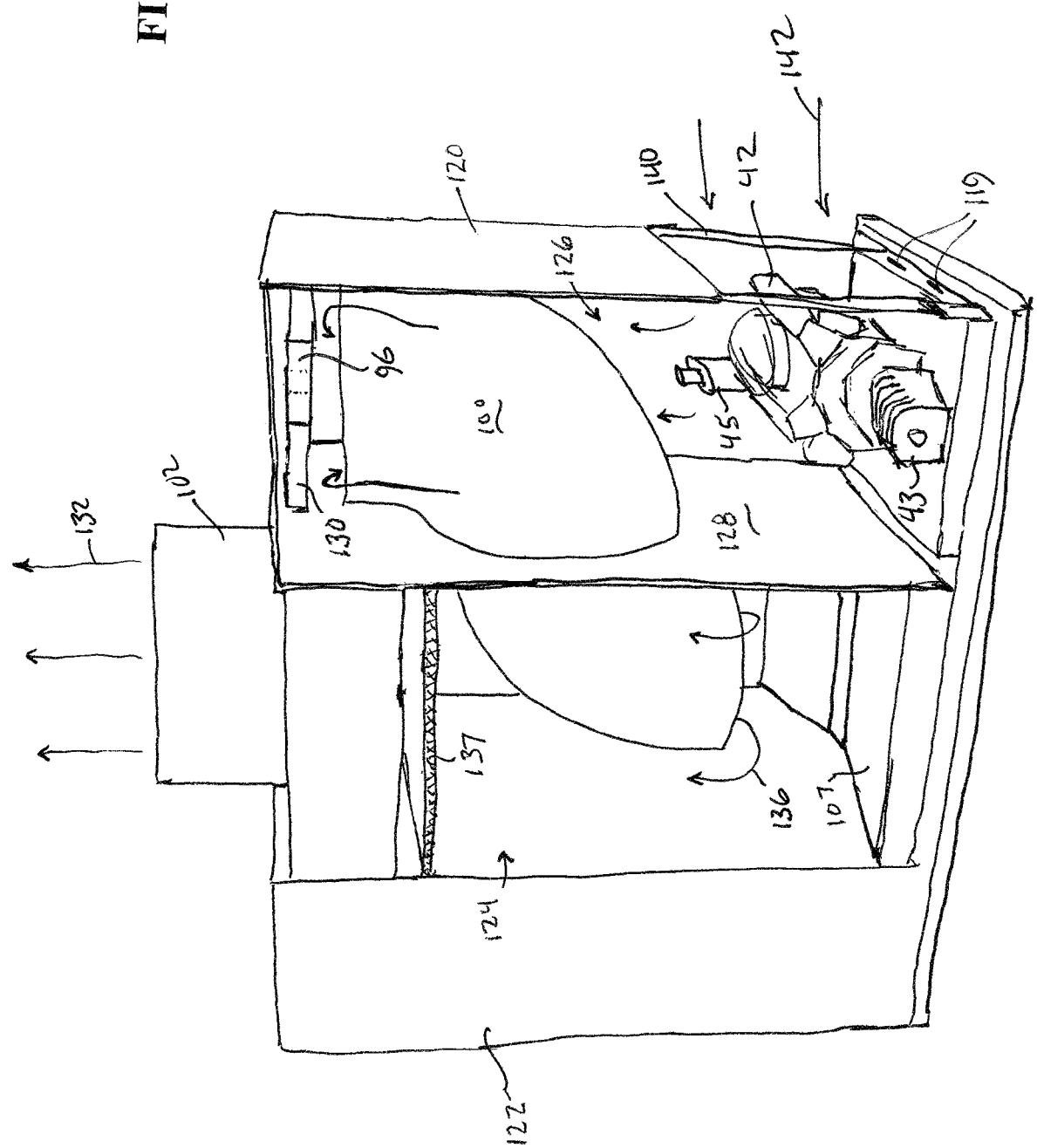
FIG. 4 is an isometric view of some of the components of the hydration system.
Figure 5:
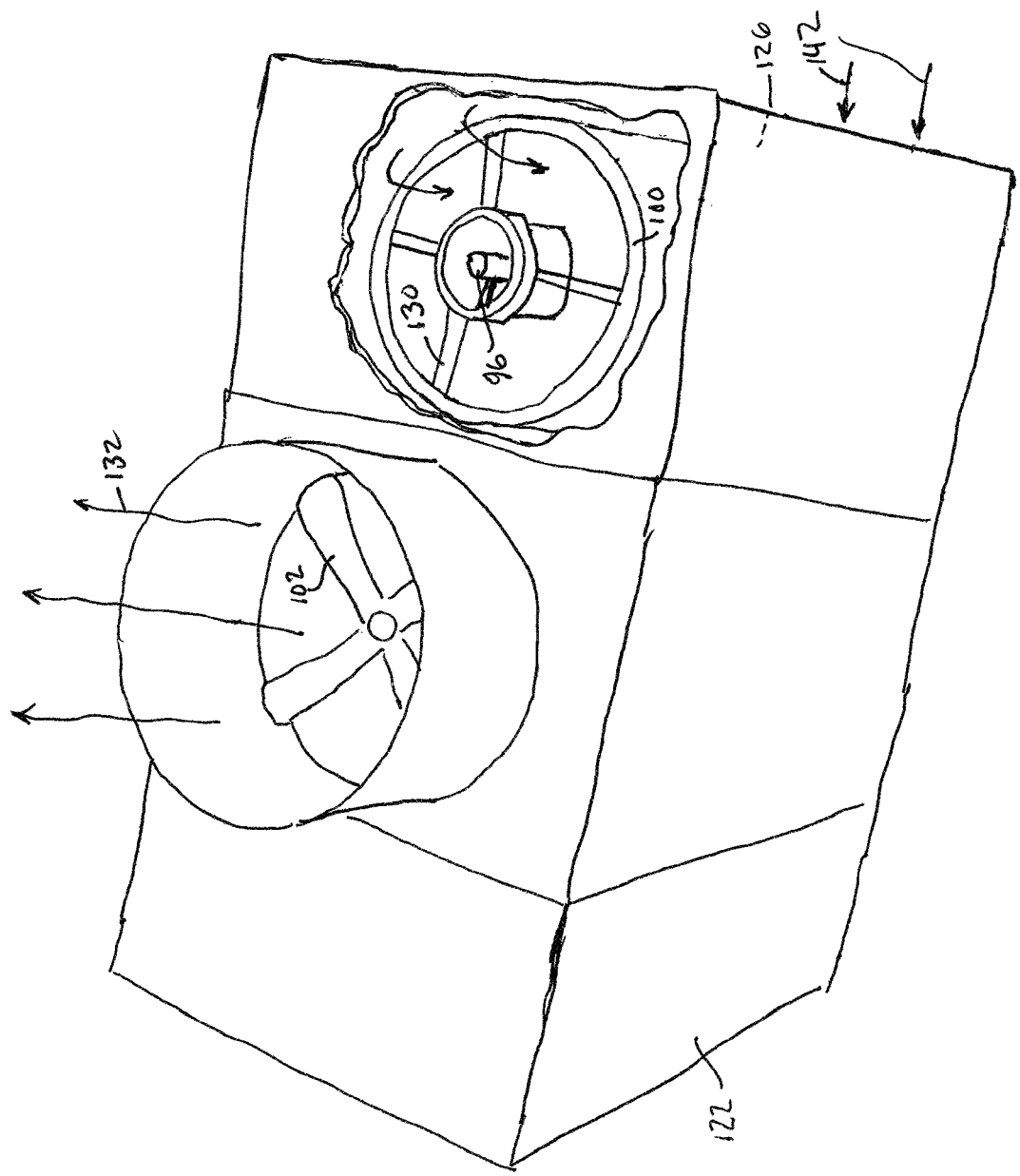
FIG. 5 is a top isometric view of the hydration system illustrating the fresh air inlet at the side and the top hydrated air outlet.

FIGS. 4 and 5 illustrate the hydration system 18 and some of the components that carry fresh air to the system 18, and expel hydrated air out of the system 18. In practice, the hydration system 18 is modularized as a single unit that is enclosed with metal panels such as shown by numerals 120 and 122. Some of the metal panels are removed in FIGS. 4 and 5 for purposes of clarity. For example, in FIG. 5, the top of the compartment 126 is closed in practice, but is shown partially cut away to show the high pressure nozzle 96 and its placement in the center of the inlet of the air duct 100. The space behind the panel 122 houses the heater 94, the four strainer filters, the separator 54 and other related apparatus. In a separate insulated compartment behind the panel 120, the programmed processor is located, together with all the associated electronic equipment. The engine 42, high pressure pump 43 and the electrical generator 45 are mounted on a separate frame so as to be easily installed or removed from the hydration system 18. The frame on which the engine 42 and associated apparatus are mounted includes a pair of lateral slots 119 into which the tines of a fork lift can be inserted to lift and remove the engine 42 and associated components. The water, fuel, electrical lines and other connections to the engine 42 are quick-connect compression type fittings to enable the removal or installation of the engine 42 in a very short period of time. The high pressure pump 43 is mounted to the front of the engine 42 and is driven by the engine crank shaft. The electrical AC generator 45 is mounted to the back of the engine 42 and is driven by the other end of the engine crank shaft.

The hydration unit 98 occupies two compartments 124 and 126 separated by a partition wall 128. The outlet compartment 124 is closed except for the top where the fan 102 pushes hydrated air into the atmosphere. The inlet compartment 126 has a closed top and a side inlet opening 140 located at the bottom on the side panel 120. The large curved air duct 100 is generally S-shaped and has an open top in the inlet compartment 126. The duct 100 extends through the partition 128 and has a bottom that opens downwardly near the bottom of outlet compartment 124. The duct 100 can be either round or rectangular in cross-sectional shape, but could be other shapes. The nozzle 96 is fixed to a mounting bracket 130 at the top opening of the duct 100 in the top of the inlet compartment 126. The nozzle 96 sprays the high temperature and high pressure water into the entrance end of the duct 100. Fresh air is drawn from the bottom opening 140 in the side panel 120 and upwardly into the entrance end of the duct 100 by the high capacity fan 102. As noted above, the fan 102 is located at the top exit end of outlet compartment 124. The fan 102 is mounted in a stack and blows hydrated air upwardly from the hydration system 18, as shown by arrows 132. The stack in which the fan 102 is mounted is of sufficient height to blow the hydrated air upwardly so that it is not recirculated back into the panel opening 140.

In operation of the hydration system 18, the high temperature and high pressure water forced through the nozzle 96 is sprayed into the entrance end of the duct 100 and thus causes flashing of the water droplets into steam. This is because the high temperature and high pressure water is sprayed into a low pressure atmosphere in the duct 100, whereupon the hot water changes phase into steam and water vapor. The suction inside the duct 100 is generated by the fan 102 and can reduce the pressure by several inches of water. Much of the steam is cooled in the duct 100 and is converted into water vapor. When the water vapor combines with the fresh air 142 drawn into the inlet end of the duct 100, it evaporates and hydrates the fresh air 142. The long path of the air in the duct 100 facilitates a high degree of hydration of the water vapor into the fresh air 142. In practice, the length of the path of air through the duct 100 is about 7-10 feet. The hydrated air exits the bottom opening of the duct 100 as shown by arrows 136, and is drawn upwardly in outlet compartment 124 by the high capacity fan 102. The hydrated air passes through a demister 137 which prevents liquid moisture from being forced upwardly into the atmosphere. Excess liquid (mist) stopped by the demister 137 falls down into the condensate pan 107. In FIG. 4, the auger 109 is not shown in the condensate pan 107. Any steam or water vapor that condenses in the duct 100 also runs into the condensate pan 107. Preferably, the mist of water droplets sprayed from the nozzle 96 are completely evaporated into the fresh air 142 and forced into the atmosphere by the fan 102. There is preferably no visible plume that is generated by the hydration system 18. This depends on the ambient conditions of the atmospheric air and its capability to absorb all the water vapor generated by the hydration system 18. If the ambient air processed by the hydration system 18 already has a high relative humidity, then some of the water vapor may not be evaporated in the duct 100 and will then be visible as it is blown into the atmosphere by the fan 102. In practice, it has been found that the hydration system 18 can process production water at the rate of more than 7 g/m and hydrate air at even a higher rate. The rate by which the hydration system 18 can process production water is dependent primarily on the ability of the heater 94 to heat the water to the desired temperature, and the ability to process a given amount of fresh air per unit of time. The processor can monitor the relative humidity of the ambient atmospheric air and adjust the rate by which the air is hydrated so that no plume is visible. The energy from the generation of steam in the hydration unit 98 can be reused in the hydrator without adding cost.

During the flash evaporation operation when the high temperature high pressure water is sprayed out of the hydrator nozzle 96, some of the water that does not vaporize falls back into condensate pan 107. This can occur in both compartments 124 and 126. If the steam or water vapor condenses in the part of the duct 100 located in compartment 126, the condensed water runs down the duct 100 and into the condensate pan 107. The condensate pan 107 is constructed with slanted sides to assure that the water collects in the bottom thereof and can run out of a drain pipe to the hydrator pump 108 and be recycled or augered out of the system. The processed water 106 can be recycled back into the duct 100 to be exposed to the fresh air circulating therethrough and evaporated so as to hydrate the fresh air, or recycled to other points in the system.

With regard again to FIG. 4, the fresh air intake opening 140 in the bottom of the side panel 120 opens into the engine compartment, which is located below the upper part of the duct 100 in the inlet compartment 126. The fresh air 142 passing around the engine 42 is drawn upwardly and into the top opening of the duct 100. The ambient air 142 circulating around the engine 42 not only cools the engine 42 but heats the circulating fresh air 142. A steam radiator can be employed to heat the incoming air 142 to convert the steam into liquid water. The heated air from the engine 42 that is input into the duct 100 serves to allow additional water vapor to be evaporated into the fresh air. It is understood that higher temperature air has the capability to absorb more water vapor as compared to lower temperature air. Stated another way, the dew point of warm air is higher than that of cool air. Since evaporation requires heat, the hotter the air the more energy is available to evaporate liquid water into water vapor. The engine 42 is additionally cooled by being located in the inlet compartment 126 with the inlet section of the duct 100 where the water vapor evaporates as it is being circulated by the duct 100 into the outlet compartment 124. The evaporation of the water vapor in the duct 100 produces a cooling effect which is transferred by conduction through the metal shell of the duct 100 to the ambient air around the engine 42.

The hydration of water using the hydration system 18 of the invention is better adapted for efficiently hydrating water by first heating the water to a high temperature, flashing the water into steam and water vapor, and then passing a large volume of air through the hydrator unit 98 to evaporate the water vapor and carry the corresponding evaporated water vapor into the atmosphere. In other words, the water is heated with an upstream heater and then transferred downstream in the system 18 where it is flashed into steam so that the water vapor easily evaporates and passes into the atmosphere. There is no open flame in the hydrator unit 98 which would represent an inefficiency as the flame would have to heat not only the water but also the surrounding air, thereby wasting energy through an inefficient process.

As noted above, the engine 42 is powered from the natural gas of the well to drive the high pressure pump 43 as well as the electrical AC generator 45. The engine 42 generates exhaust gases that are processed through the hydration unit 98, and are not released directly to the atmosphere. The exhaust gases from the exhaust system 45 of the engine 42 are directed upwardly in the inlet compartment 126 as fresh air 142 is drawn in at the opening in the bottom of the side panel 120. The hot exhaust gases of the engine 42 rise upwardly and are drawn into the top opening of the duct 100 and come into contact with the hot water sprayed by the hydrator nozzle 96. The hot exhaust gasses not only heat the incoming air so as to hold more water vapor, but any particulate matter carried by the engine exhaust is scrubbed therefrom and collected with the liquid water in the condensate pan 107. The hydration unit 98 thus functions as a scrubber to prevent the particulate matter from the engine exhaust from being released to the atmosphere.

The heater 94 also generates exhaust fumes from the flame that heats the finned coil through which the separated water flows to the hydration unit 98. The exhaust fumes of the heater 94 can also be coupled to the top inlet of the duct 100 by suitable insulated ducting (not shown). In like manner, the exhaust fumes from the heater 94 heat the incoming fresh air 142 so that additional water vapor can be disposed of, as well as provide a scrubbing action to any particulate matter carried by the heater exhaust fumes.

Figure 6:
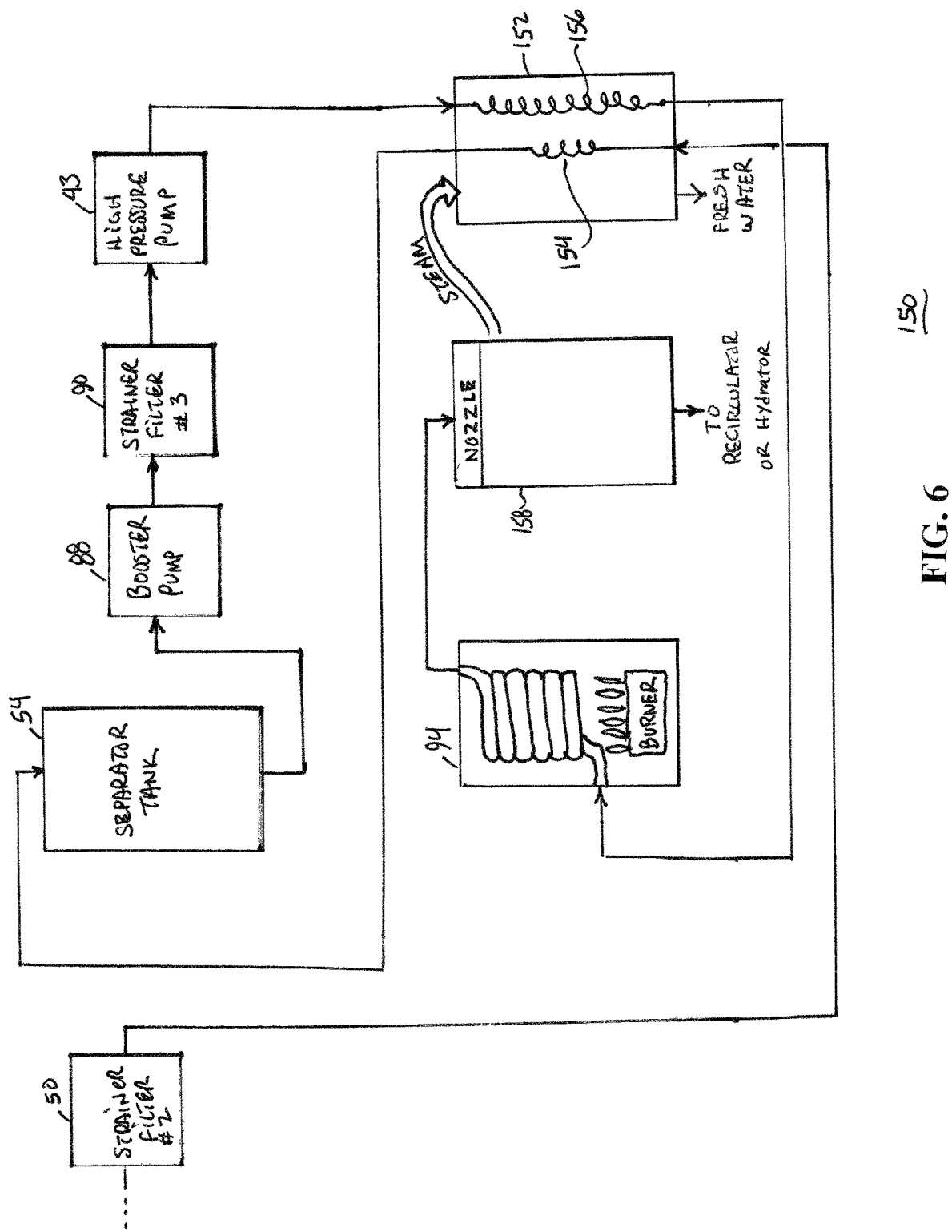
FIG. 6 is a block diagram of a high efficiency hydration system according to another embodiment of the invention.

FIG. 6 illustrates the components of a high efficiency hydration system 150 constructed according to another embodiment of the invention. While not shown, the upstream components that are connected to the strainer filter 50 are shown in FIG. 2. From the strainer filter 50, the filtered production water is coupled to a condenser unit 152. As will be described below, steam generated by the system is coupled to the condenser unit 152 and condensed into a purified form of water. In any event, the production water passing through the condenser 152 is heated from about 100 degrees F. to about 210 degrees F. before being coupled to the separator 54. A much more efficient separation of the water, oil and vapors is achieved in the separator 54 when the temperature of the filtered production water is elevated. As a result, the separated water output from the separator 54 is about 185 degrees F., or less. The separator 54 can be cooled by inputting air thereto which lowers the temperature by evaporating the water. As described in connection with FIG. 2 above, the separated water is coupled by a booster pump 88 through a third strainer filter 90, and to the high pressure pump 43. The high pressure pump 43 raises the pressure of the separated water to about 1,500 psi.

The high pressure water from the pump 43 is coupled to a coil 156 in the condenser unit 152 where the water is heated an additional amount, preferably to about 212 degrees F. The high pressure water is further increased in temperature to about 550 degrees F. in the finned coil of the heater 94 before it is coupled to the nozzle of the hydration unit 158. The details of the hydration unit 158 are shown in FIG. 7.

Figure 7:
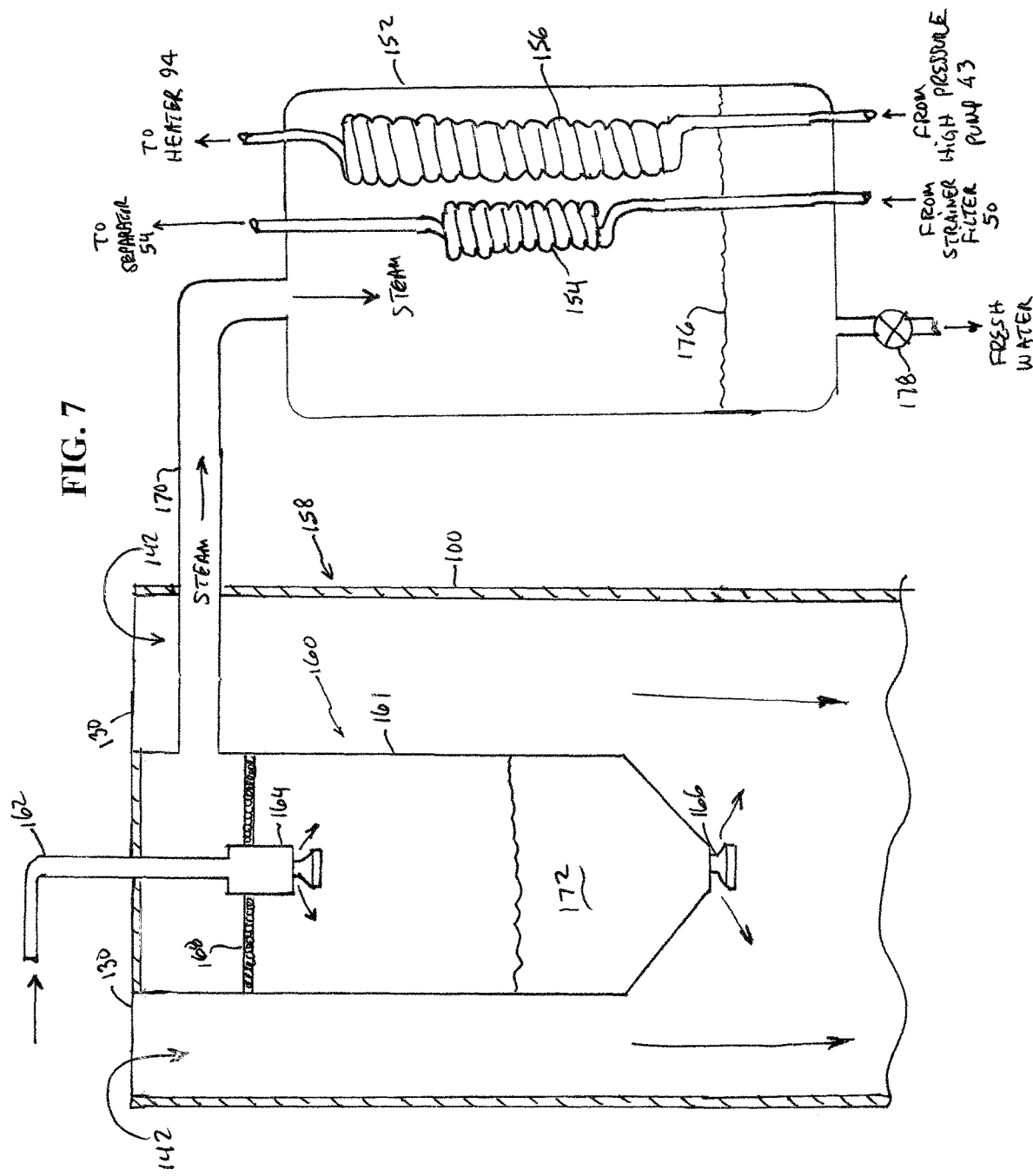
FIG. 7 is a diagram of a combination steam/water nozzle.

In FIG. 7, the inlet section of the S-shaped duct 100 supports the combination steam/water nozzle 160 at the top opening thereof, which allows only the water portion of the spray from the steam/water nozzle 160 to pass into the duct 100 to be hydrated. The combination steam/water nozzle 160 is enclosed in a housing 161 that is fastened by a bracket (not shown). Fresh air 142 is drawn into the top opening of the duct 100 and downwardly past the combination steam/water nozzle 160. The high temperature and high pressure water from the heater 94 enters the housing 161 of the combination steam/water nozzle 160 via the pipe 162 and operates either a pneumatic-operated nozzle 164 of the type described above, or a spring-operated nozzle of the type described above in connection with the patents by Sherry. The combination steam/water nozzle 160 includes a first upper nozzle 164 and a second lower nozzle 166, the latter of which is located at the bottom of the housing 161 of the combination steam/water nozzle 160. About 35% to 50% of the hot water sprayed from the upper nozzle 164 flashes into steam which is carried upwardly through a demisting filter 168 through piping 170 to the condenser 152. The remaining hot water 172 sprayed from the upper nozzle 164 falls to the bottom of the housing 161 of the combination steam/water nozzle 160. The water 172 collected at the bottom of the housing 161 provides a barrier to the escape of the steam from the bottom of the combination steam/water nozzle 160. A float sensor (not shown) senses the level of the water 172 and if the water exceeds a certain level, it can be drained out under processor control and recirculated for reprocessing.

As noted above, the high temperature water that is pumped into the combination steam/water nozzle 160 is around 1,500 psi, and thus there is a pressure inside the nozzle housing 161. This pressure operates the bottom nozzle 166 to provide an orifice through which the liquid hot water 172 at the bottom of the housing 161 is sprayed into the underlying space within the duct 100. The lower nozzle 166 is preferably of the spring-operated type as described in the Sherry patents identified above, but could be an air pressure activated nozzle. As the pressure inside the housing 161 increases, the nozzle member moves to open the orifice correspondingly to maintain the pressure inside the housing 161 substantially constant. The water sprayed into the duct 100 is substantially all water and very little, if any, water vapor. The sprayed water mixes with the air 142 drawn into the duct 100 to form water vapor and hydrate the air. While not shown, the fan 102 draws the fresh air 142 through the duct 100, and together with the water sprayed therein by the lower nozzle 166, hydration occurs. It can be seen that this apparatus separates the steam and removes it from the duct 100 so that the energy of the steam can be used elsewhere. For example, the steam exiting the housing 161 and carried by the pipe 170 can also be routed to a steam radiator to heat incoming air to the hydration unit 150. The excess steam can also be employed with a steam educator or ejector to produce a low pressure area for mixing therewith a liquid, such as water to be injected into the duct 100 of FIG. 2. When employing a steam ejector in this application, the pump 108 would not be required as the steam ejector would provide the vacuum sufficient to pull the water out of the concentrate pan 107, through the strainer/filter and into the duct 100. The steam ejector would be mounted in the wall of the duct 100 at a location where it is desired to inject the water from the concentrate pan 107 into the stream of air.

The pressure in the nozzle housing 161 forces the steam out of the nozzle housing 161 via the pipe 170 to the condenser 152. The steam enters the condenser 152 and contacts the cooler surfaces of the equipment therein, including the water 176 at the bottom of the condenser 152 and the condenser coils 154 and 156. As a result, the steam condenses into water which settles to the bottom of the condenser 152. The hot steam that contacts the coils 154 and 156 heats the coils and thus preheats the liquid flowing therethrough. The filtered production water flowing through the coil 154 preheats the same before entering the separator 54. The pressurized water flowing through the coil 156 preheats the same before entering the heater 94. Thus, in using the steam to produce a purified form of water, the energy of the steam also preheats the liquids and air in various parts of the hydration system 18 so that such energy is not lost. The purified water 176 collected in the bottom of the condenser 152 is drained under processor control through the valve 178 and can be used for any suitable purpose at the well site or temporarily stored in the tank 34 for use as a source of fresh water for fracing a gas well at a nearby location. In addition, in any embodiment of the hydration system 18, the hydrated water vapor that is forced into the air can be partially recovered as fresh water for use by livestock, crops, and the like. In this latter instance, some or all of the hydrated air released by the hydration systems 18 and 150 can be collected or captured and passed through a condenser to produce fresh water and, when cooled, can be used in any manner.

The use of the combination steam/water nozzle 160 thus produces steam for generating water, as well as a spray that hydrates a large volume of air that passes through the water vapor of the spray. Accordingly, the production water is used for two purposes and thus the rate of processing the production water is increased. It is also noted that the water vapor generated by the combination steam/water nozzle 160 is passed to the condenser 152 together with the steam and disposed of therein, rather than being hydrated into the fresh air. An additional advantage is achieved because even if the atmospheric conditions limit the amount of water hydrated therein, additional water can be disposed of by purifying the same and using it for other useful purposes.

While the combination steam/water nozzle 160 is described as generating steam for producing a purified form of water, the steam can be used for other useful purposes at the well site. Also, in the various embodiments described herein, the hydrated air is moved using a large-volume fan 102 driven by a variable speed motor. By varying the speed of the fan motor, the temperature of the hydrated air forced out of the system 18 can be controlled. The rate of hydration can also be controlled by adjusting the speed of the fan 102, so that if the rate of hydration is to be increased, the speed of the fan 102 is increased to move a greater volume of fresh air. An alternative means for moving the air through the hydrator system 18 is to use a jet fan to blow the steam from the hydrator nozzle into the air and hydrate it directly into the atmosphere. A jet fan can be used for moving a large volume of air in a column or cone so that the hydrated air is blown well up into the atmospheric air above the hydration system 18. Moreover, the jet fan can hydrate the water vapor and lift it high into the air to evaporate it before it can turn back into water in the atmosphere.

Figure 8:
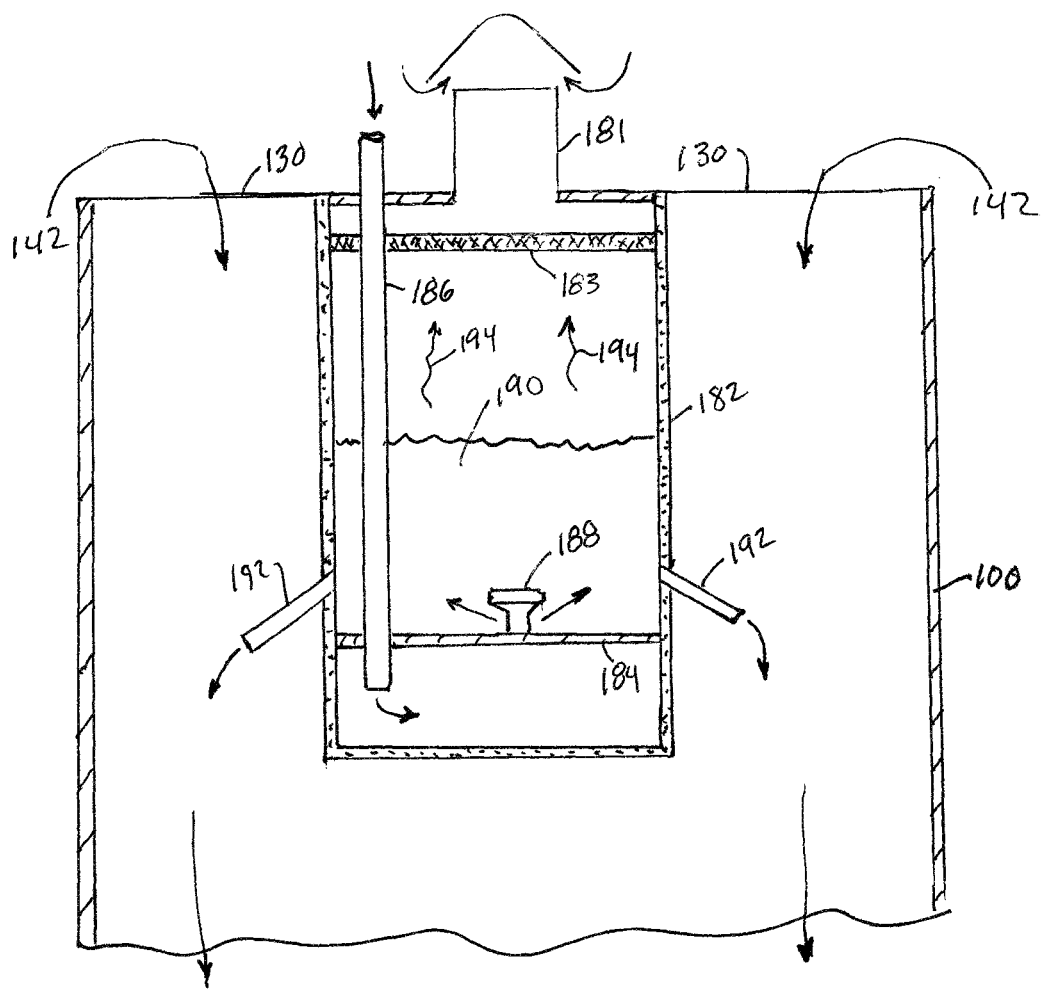
FIG. 8 is a diagram of an "upside down" nozzle arrangement constructed according to another embodiment of the invention.

FIG. 8 illustrates another nozzle configuration 180. Here, an "upside-down" nozzle arrangement 180 is fixed in the top entrance of the duct 100 with bracket supports 130. The nozzle 180 includes an insulated cylindrical housing 182 that encloses the sides and bottom, but has a top opening coupled to a jet fan 181. A lateral divider 184 provides the nozzle 180 with an upper compartment and a lower compartment. A pipe 186 couples the 550 degrees F. and 1,500 psi water into the bottom compartment where the pressure therein operates a nozzle member 188 to spray the hot water upwardly into the upper compartment. Hot water 190 collects in the upper compartment and is coupled through plural feeder tubes 192 into the downwardly directed stream of fresh air 142. The water fed through the feeder tubes 192 hydrates the fresh air 142 which is carried out of the duct 100 by the fan 102 (not shown) and blown into the atmosphere. The hot water sprayed into the upper compartment by the nozzle member 188 flashes into steam 194 when exposed to the low pressure atmosphere. It is noted that the nozzle member 188 allows the hot water to be sprayed therethrough into the bath of hot water 190 located in the bottom of the upper compartment. The steam 194 rises upwardly and passes through a demisting filter 183. Water that remains in liquid droplet form does not pass through the demisting filter 183, but drops down into the bath of hot water 190. The steam can either be hydrated directly into the atmosphere, or be drawn downwardly into the duct 100 by the stream of fresh air 142 drawn therein by the fan 102. In the preferred form of the nozzle configuration 180, the jet fan 181 draws the steam upwardly from the demisting filter 183 and mixes the same with fresh air. The steam quickly turns into water vapor which evaporates and is blasted into the atmosphere as a high speed, high velocity jet stream. The housing 182 is insulated to prevent the escape of heat from the hot water 190 contained therein. While not shown, the volume of hot water allowed to exit the upper compartment of the nozzle arrangement 180 can be controlled by electrically-operated valves controlled by the processor. Also, the level of the hot water 190 in the upper compartment can be sensed by a number of level sensors to determine how much water should be drained out of the upper compartment via the feeder tubes 192. A spray nozzle (not shown) can be connected to each of the feeder tubes 192 to produce a spray pattern of hot water into the fresh air 142 drawn through the duct 100.

From the foregoing, it can be seen that the programmed processor controls many components of the hydration system 18, based on various sensors and monitors. To that end, the hydration system 18 can be controlled to vary operating parameters based on different variables, such as the humidity of the air being hydrated, the temperature of the ambient air, the wind velocity and direction and the location of nearby buildings or dwellings, time of day, rain conditions, sunny or fog conditions, the jet stream, etc. For example, if the temperature of the ambient air is high, then the speed of the fan 102 can be adjusted and the throughput of production water in the hydration system 18 can be increased to increase the rate of hydration. Since warmer air can hold more water vapor, the system 18 can increase hydration of the warmer air which can accommodate more water vapor.

Either the wellhead 10 or the hydration system 18, or both, can be equipped with fire control apparatus to detect the presence of smoke or a fire and carry out procedures to control the fire with pressurized retardants which are well known in the art. To that end, fire and smoke detectors can be employed at specified locations at the well site to provide an early warning of the potential of a fire. Such detectors can be monitored by the programmed processor of the hydration system 18.

While the preferred and other embodiments of the invention have been disclosed with reference to specific water hydration systems, and associated methods of fabrication and operation thereof, it is to be understood that many changes in detail may be made as a matter of engineering choices without departing from the spirit and scope of the invention, as defined by the appended claims.

What is claimed is:

1. A hydration system for introducing separated water vapor into the ambient atmosphere, said system comprising:
    a fluid separator including a vessel having an inlet for receiving a mixture of fluids including water to be separated, and a water outlet for egress of separated water;
    a pump fluidically connected to said water outlet for pressurizing the separated water;
    a heater for heating the pressurized water to produce heated, pressurized water;
    a hydration unit including:
        a first compartment;
        a second compartment;
        a partition wall separating said first and second compartments;
        a duct extending from said first compartment to said second compartment through said partition wall, a first open end of said duct positioned in an upper portion of said second compartment, while a second open end of said duct positioned in a lower portion of said first compartment;
        a first nozzle through which said heated, pressurized water is sprayed into said first open end of said duct in said second compartment; and
        a fan causing atmospheric air to flow in through said first open end of said duct and out through said second open end of said duct, and into the ambient atmosphere with a higher moisture content than when said atmospheric air flowed into said duct.

2. The hydration system of claim 1, wherein said duct is S-shaped.

3. The hydration system of claim 1, wherein said fan is located adjacent said second open end of said duct.

4. The hydration system of claim 1, wherein said first nozzle is fixed centrally at said first open end of said duct.

5. The hydration system of claim 1, wherein said hydration unit includes removable panels defining an enclosure.

6. The hydration system of claim 1, wherein said heater is capable of heating said separated water to a temperature which will cause it to flash evaporate when sprayed through said first nozzle.

7. The hydration system of claim 1, further including an engine for driving the pump and for driving a generator for providing AC electrical power to components of said hydration system.

8. The hydration system of claim 1, wherein said separator includes a second nozzle for introducing fluids to be separated.

9. The hydration system of claim 1, further including a condensate pan to collect any water that which was not converted into a vapor.

10. The hydration system of claim 9, further including a hydrator pump for pumping the any collected water from said condensate pan from the bottom of the hydrator unit to the first open end of said duct to be hydrated.

11. The hydration system of claim 1, wherein said separator includes at least one sensor for sensing the level of a liquid in the vessel.

12. The hydration system of claim 1, wherein the hydration system is secured within a trailer mounted module capable of being locked.

13. The hydration system of claim 1, wherein said first nozzle includes a nozzle member movable with respect to a seat to form an orifice, and said heated, pressurized water applies a force to move said nozzle member to form said orifice through which said heated, pressurized water flows to form said spray.

14. The hydration system of claim 13, wherein said first nozzle further includes a force producing mechanism which applies a counterforce to said nozzle member.

15. The hydration system of claim 14, wherein said force producing mechanism comprises one of a spring or a pneumatic cylinder.

* * * * *